United States Patent
Ryan et al.

(10) Patent No.: US 12,432,058 B2
(45) Date of Patent: Sep. 30, 2025

(54) SYSTEM AND METHOD FOR PREVENTION OF ELECTRONIC CONTENT CAPTURE USING AN EMBEDDED KEY SERVER MODULE

(71) Applicant: Sunroom, Los Angeles, CA (US)

(72) Inventors: Nikolas Sean Ryan, Los Angeles, CA (US); Lucy Mort, Los Angeles, CA (US)

(73) Assignee: Sunroom, Los Angeles, CA (US)

( * ) Notice: Subject to any disclaimer, the term of this patent is extended or adjusted under 35 U.S.C. 154(b) by 203 days.

(21) Appl. No.: 18/467,488

(22) Filed: Sep. 14, 2023

(65) Prior Publication Data

US 2023/0421373 A1     Dec. 28, 2023

Related U.S. Application Data

(63) Continuation-in-part of application No. 17/643,763, filed on Dec. 10, 2021, now Pat. No. 11,775,620.

(51) Int. Cl.
*H04L 29/06* (2006.01)
*H04L 9/08* (2006.01)

(52) U.S. Cl.
CPC .......... *H04L 9/0894* (2013.01); *H04L 9/0825* (2013.01); *H04L 9/0866* (2013.01)

(58) Field of Classification Search
CPC .... H04L 9/0894; H04L 9/0825; H04L 9/0866
See application file for complete search history.

(56) References Cited

U.S. PATENT DOCUMENTS

| | | | |
|---|---|---|---|
| 8,903,088 B2* | 12/2014 | Schultz | H04N 21/8352 380/211 |
| 2007/0107062 A1* | 5/2007 | Abu-Amara | H04N 21/8355 348/E7.071 |
| 2008/0123844 A1* | 5/2008 | Sun | H04N 7/17318 348/E7.071 |
| 2009/0262122 A1 | 10/2009 | Darsa et al. | |

(Continued)

OTHER PUBLICATIONS

"International Search Report and Written Opinion" mailed on Mar. 16, 2023, for International Application No. PCT/US2022/081360, 14 pages.

(Continued)

*Primary Examiner* — Dao Q Ho
(74) *Attorney, Agent, or Firm* — Perkins Coie LLP; Lena Petrovic; Vikram Iyengar (57) ABSTRACT

Methods, systems, and apparatus for prevention of electronic content capture using an embedded key server module are described. A user device sends a request to a computer for media content segments. The user device receives a manifest file and the media content segments from the computer. The media content segments are encrypted using a media encryption key and initialization vector. The user device detects that the media content segments are encrypted, and generates a key request for decryption of the media content segments. A key server module embedded within a computer application creates a key response including the media encryption key and initialization vector. The user device decrypts the media content segments using the media encryption key and initialization vector in the key response. The user device generates a display of the media content segments on a screen of the user device.

15 Claims, 5 Drawing Sheets

(56) References Cited

U.S. PATENT DOCUMENTS

| | | |
|---|---|---|
| 2014/0006782 A1 | 1/2014 | Johnson et al. |
| 2014/0270161 A1* | 9/2014 | Shamsaasef ....... H04N 21/4405 |
| | | 386/259 |
| 2016/0088366 A1* | 3/2016 | Hunacek ............ H04N 21/8355 |
| | | 725/31 |
| 2016/0182466 A1* | 6/2016 | Wagenaar ........... H04L 63/0876 |
| | | 713/154 |
| 2016/0224799 A1* | 8/2016 | Uzun .................. G06F 21/6227 |
| 2016/0241934 A1 | 8/2016 | Harrison |
| 2016/0246999 A1 | 8/2016 | Pielot |
| 2016/0253508 A1 | 9/2016 | Song |
| 2017/0116693 A1* | 4/2017 | Rae ...................... G06Q 50/184 |
| 2018/0019962 A1 | 1/2018 | Sayko et al. |
| 2019/0050666 A1 | 2/2019 | Kim et al. |
| 2020/0004930 A1 | 1/2020 | Myman |
| 2020/0068241 A1* | 2/2020 | Ma ...................... H04N 21/2541 |
| 2022/0417313 A1* | 12/2022 | Vinahradau ......... H04L 63/0428 |
| 2023/0306090 A1* | 9/2023 | Elad ...................... H04L 9/0866 |

OTHER PUBLICATIONS

Dylko et al. "Medla effects in an era of rapid technological transformation; A case of user-generated content and political participation." Communication Theory 22.3 (2012) 250-278. Aug. 2012.

\* cited by examiner

SYSTEM AND METHOD FOR PREVENTION OF ELECTRONIC CONTENT CAPTURE USING AN EMBEDDED KEY SERVER MODULE

CROSS-REFERENCE TO RELATED APPLICATION(S)

This application is a continuation-in-part of U.S. patent application Ser. No. 17/643,763, filed Dec. 10, 2021, which is incorporated by reference in its entirety herein.

TECHNICAL FIELD

The present disclosure is generally related to digital media communication and specifically to systems and computer-implemented methods for prevention of electronic content capture using an embedded key server module.

BACKGROUND

Digital rights management (DRM) tools and technological protection measures (TPM) refer to access control technologies for restricting the use of proprietary hardware and copyrighted works. Worldwide, several measures have been put in place to criminalize the circumvention of DRM, communication about such circumvention, and the creation and distribution of tools used for such circumvention. However, traditional methods that include restrictive licensing agreements are typically insufficient to provide fine-grained restriction of access to digital materials. Moreover, traditional methods can sometimes cause problems for legitimate consumers while trying to distinguish between legitimate and illegitimate users.

SUMMARY

Methods, apparatus, and systems for prevention of electronic content capture using an embedded key server module are disclosed. In some implementations, a non-transitory computer readable storage medium stores a computer application downloaded from, e.g., an app store. The computer application includes computer instructions for prevention of electronic content capture. When the instructions are executed by one or more computer processors of a user device, the instructions cause the one or more computer processors to send a user request for media content segments to a computer system. The media content segments are meant for playback on the user device. The user device receives a manifest file and the media content segments from the computer system. The media content segments are encrypted by the computer system using a media encryption key and initialization vector generated by the computer system. The manifest file includes the media encryption key and initialization vector.

The user device detects that the media content segments are encrypted. In response to detecting that the media content segments are encrypted, the user device generates a key request for decryption of the media content segments. In response to generation of the key request, the user device provides a key response using a key server module embedded within the computer application. The key response includes the media encryption key and initialization vector obtained from the manifest file. The user device decrypts the media content segments using the media encryption key and initialization vector in the key response. The user device generates a display of the media content segments on a screen of the user device.

In some embodiments, a non-transitory computer readable storage medium stores a computer application comprising computer instructions for prevention of electronic content capture. The computer instructions, when executed by one or more computer processors of a user device, cause the user device to send, to a computer server, a user request for media content for playback on the user device. The user device receives, from the computer server, a media encryption key and media content segments corresponding to the media content. The media content segments are encrypted, by the computer server, using the media encryption key. The user device detects that the media content segments are encrypted. Responsive to detecting that the media content segments are encrypted, the user device generates a key request for decryption of the media content segments. Responsive to generation of the key request, the user device provides, using a key server module embedded within the computer application, a content key context based on the media encryption key. The user device decrypts, using the content key context, the media content segments. The user device generates a display of the media content segments on a screen of the user device.

In some embodiments, the media encryption key is encrypted using a public key. The computer instructions cause the user device to retrieve a private key corresponding to the public key from a secure compartment of the user device. The user device decrypts the media encryption key using the private key.

In some embodiments, the user device generates a key pair comprising a public and a private key. The user device stores the private key within a secure compartment of the computer system. The user device sends the public key, to the computer server, for encrypting the media encryption key.

In some embodiments, the media encryption key is a public key. The user device retrieves a private key corresponding to the public key from a secure enclave of the user device and performs decryption of the media content segments using the private key.

In some embodiments, the computer instructions obviate a need for the user device to communicate with a remote key server to obtain the media encryption key.

In some embodiments, the key server module is an executable computer program.

In some embodiments, the media content segments comprise an MPEG2 transport stream, and the manifest file comprises an M3U8 file.

In some embodiments, the media content segments are encrypted using an advanced encryption standard (AES) algorithm.

In some embodiments, the key request comprises a server playback context, and the key response comprises a content key context.

In some embodiments, one or more processors receive a first media content frame from a first computer device. The one or more processors determine that one or more user interface elements are present in the first media content frame. The one or more processors extract the one or more user interface elements from the first media content frame. The one or more processors convert the one or more user interface elements to video. The one or more processors encrypt the video to prevent screenshot capture of the one or more user interface elements present in the first media content frame by a second computer device lacking a decryption key when the video is played on a digital screen of the second computer device. The one or more processors generate a second media content frame including the first media content frame overlaid by the video. The one or more processors transmit the second media content frame to the second computer device for the second media content frame to be played on the digital screen of the second computer device.

These and other aspects, features, and implementations can be expressed as computer-implemented methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

Detailed descriptions of implementations of the present technology will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "610") can implement components, operations, or structures (e.g., "610*a*") described as a single instance. Further, plural instances (e.g., "610") refer collectively to a set of components, operations, or structures (e.g., "610*a*") described as a single instance. The description of a single component (e.g., "610*a*") applies equally to a like-numbered component (e.g., "610*b*") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

This document presents computer-implemented methods, systems, and apparatuses for prevention of electronic content capture using an embedded key server module. Some embodiments disclosed herein describe a non-transitory computer readable storage medium storing a computer application comprising computer instructions for prevention of electronic content capture. The computer instructions, when executed by one or more computer processors of a user device, cause the user device to send, to a computer server, a user request for media content for playback on the user device. A manifest file and the media content segments are received from the computer server. The media content segments are encrypted, by the computer server, using a media encryption key and initialization vector generated by the computer server. The manifest file comprises the media encryption key and initialization vector. The user device detects that the media content segments are encrypted. Responsive to detecting that the media content segments are encrypted, a key request for decryption of the media content segments is generated. Responsive to generation of the key request, a key server module embedded within the computer application provides a key response comprising the media encryption key and initialization vector obtained from the manifest file. Using the media encryption key and initialization vector in the key response, the media content segments are decrypted. A display of the media content segments is generated on a screen of the user device.

In some implementations, a first media content frame received from a first computer device. It is determined that one or more user interface elements are present in the first media content frame. The user interface elements are extracted from the first media content frame. The user interface elements are converted to video. The video is encrypted to prevent screenshot capture of the one or more user interface elements present in the first media content frame by a second computer device lacking a decryption key when the video is played on a digital screen of the second computer device. A second media content frame is generated including the first media content frame overlaid by the video. The second media content frame is transmitted to the second computer device for the second media content frame to be played.

The advantages and benefits of the methods, systems, and apparatuses for prevention of electronic content capture using an embedded key server module disclosed herein include preventing screenshot capture and dissemination of confidential information. The methods disclosed herein significantly reduce license acquisition time, communication bandwidth needed, and hardware resources needed compared to traditional methods that require a hardware computer key server separate from the user device. Because the systems disclosed herein bundle a key server module into an executable program shipped with a computer application to a user device, the computer application runs the executable program locally instead of having to communicate with a remote key server. Thus, runtime, data sent, and encryption time are significantly reduced compared to conventional apparatuses.

The disclosed methods securely deliver keys to mobile devices and other user devices that enable playback of encrypted video content. The systems disclosed herein enable user devices to stop playback based on expiration information sent with the key. The disclosed apparatuses enable content providers to securely deliver, e.g., an AES 128-bit content key, bundled with a computer application to user devices. A benefit provided by the disclosed systems is that interception by a malicious user attempting to decrypt media outside of a DRM environment (making an HTTP request for the manifest, downloading the media segments, and running a tool to decrypt content using the media encryption key and initialization vector) is prevented. A trusted execution environment on computer devices enables key pairs to be "attested" by a content provider or computer server as being received from the trusted execution environment. Therefore, a public key received from a user device can be trusted to be securely generated and stored in the user device. Moreover, malicious entities are prevented from generating spoof keys in an attempt to circumvent the secure transmission from the computer server to the application.

Furthermore, enterprise protection of HTTP Live Streaming (HLS) audio and video is implemented. The embodiments disclosed enable digital rights management, such as for copyright-protected media content. The implementations herein are compatible with key systems adopted throughout the industry, and reduce power consumption on mobile devices compared to traditional methods. Using the methods disclosed, content creators can limit user recording and sharing of premium content without a valid decryption key. Moreover, a content creator can limit screenshot capture to particular portions or elements of the media content, such as user interface elements, while permitting screenshot capture of remaining portions of a screen.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Figure 1:
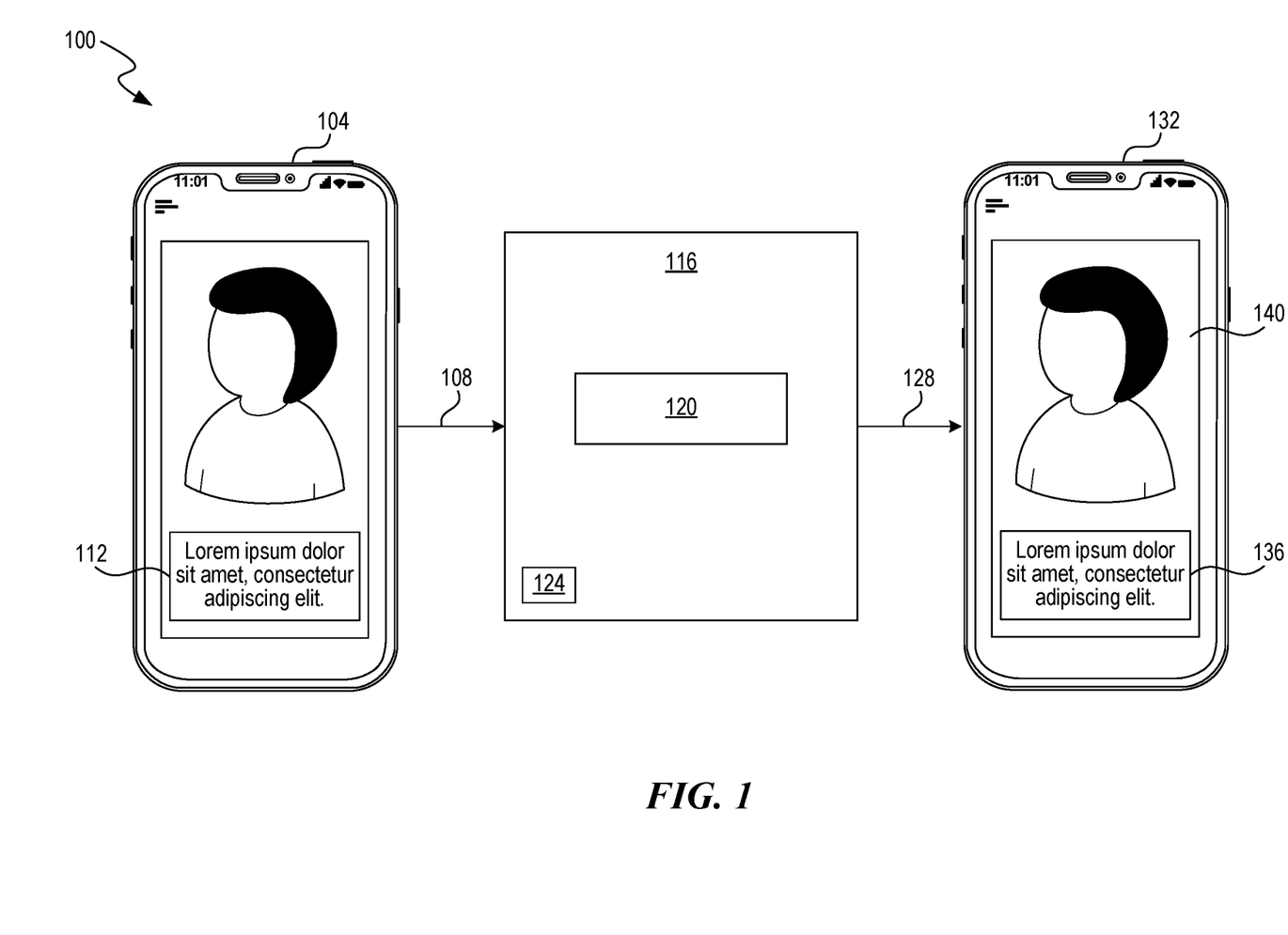
FIG. 1 is a block diagram illustrating an example environment for prevention of electronic content capture using an embedded key server module, in accordance with one or more embodiments.

FIG. 1 is a block diagram illustrating an example environment 100 for prevention of electronic content capture using an embedded key server module, in accordance with one or more embodiments. The environment 100 includes a first computer device 104, a device 116, and a second computer device 132. The environment 100 is implemented using the components of the example computer system 400 illustrated and described in more detail with reference to FIG. 4. Likewise, embodiments of the environment 100 can include different and/or additional components, or be connected in different ways.

The first computer device 104 is a smartphone, tablet, laptop, desktop, computer server, etc., and is implemented using the components of the example computer system 400 illustrated and described in more detail with reference to FIG. 4. The first computer device 104 connects to the device 116 using a hardwired connection (e.g., the bus 416) or the network 414 and/or the network adapter 412 illustrated and described in more detail with reference to FIG. 4. A user, such as a content creator, uses the first computer device 104 to create or send media content, such as video, virtual reality content, augmented reality content, etc., to the device 114. The content can be a brand video, a social media video, or animated content. The content can include still images, video, user interface elements 112, such as chat bubbles, soft buttons, menus, icons, comment bubbles, any other user interface element, or a combination thereof.

The content created or transmitted by the first computer device 104 can be premium content. Premium content is a type of digital content that may be accessed for a fee, and is usually of higher quality or more desirable than free content. A content creator may seek to prevent a downstream user of the premium content from recording, capturing by screenshot, or sharing the premium content with unauthorized users. The content creator may seek to prevent a downstream user from recording, capturing by screenshot, or sharing only particular portions of the premium content with unauthorized users. The content creator may seek to prevent a downstream user from recording or capturing by screenshot only particular portions of a digital screen on which the premium content is played. For example, the content creator may seek to prevent a downstream user from recording or capturing by screenshot only the user interface elements displayed on a user's screen or some other particular portion of the screen.

The device 116 is a smartphone, tablet, laptop, desktop, computer server, etc., and is implemented using the components of the example computer system 400 illustrated and described in more detail with reference to FIG. 4. The device 116 includes a software module 120 that can store and/or execute computer-readable instructions, e.g., the instructions 404, 408 illustrated and described in more detail with reference to FIG. 4. In some embodiments, the software module 120 implements the machine learning system 300 illustrated and described in more detail with reference to FIG. 3. The device 114 connects to the second computer device 132 using a hardwired connection (e.g., the bus 416) or the network 414 and/or the network adapter 412 illustrated and described in more detail with reference to FIG. 4.

The second computer device 132 (sometimes referred to as a user device) is a smartphone, tablet, laptop, desktop, computer server, etc., and is implemented using the components of the example computer system 400 illustrated and described in more detail with reference to FIG. 4. A user, such as a consumer of online content, uses the second computer device 132 to receive and play media content, such as video, virtual reality content, augmented reality content, etc. The content is played on a digital screen 140 of the second computer device 132. Audio components of the content are played on a built-in speaker of the second computer device 132.

The device 116 receives a first media content frame 108 from the first computer device 104. In some embodiments, the first media content frame 108 is a portion of a video displayed on a screen for, e.g., 1/24, 1/25, or 1/30 of a second. In other embodiments, the first media content frame 108 is a frame of high-definition video. In other embodiments, the first media content frame 108 is represented as a digital waveform in which pixels represent an intensity and color of light across a screen. The device 116 determines that the one or more user interface elements 112 are present in the first media content frame 108.

Figure 3:
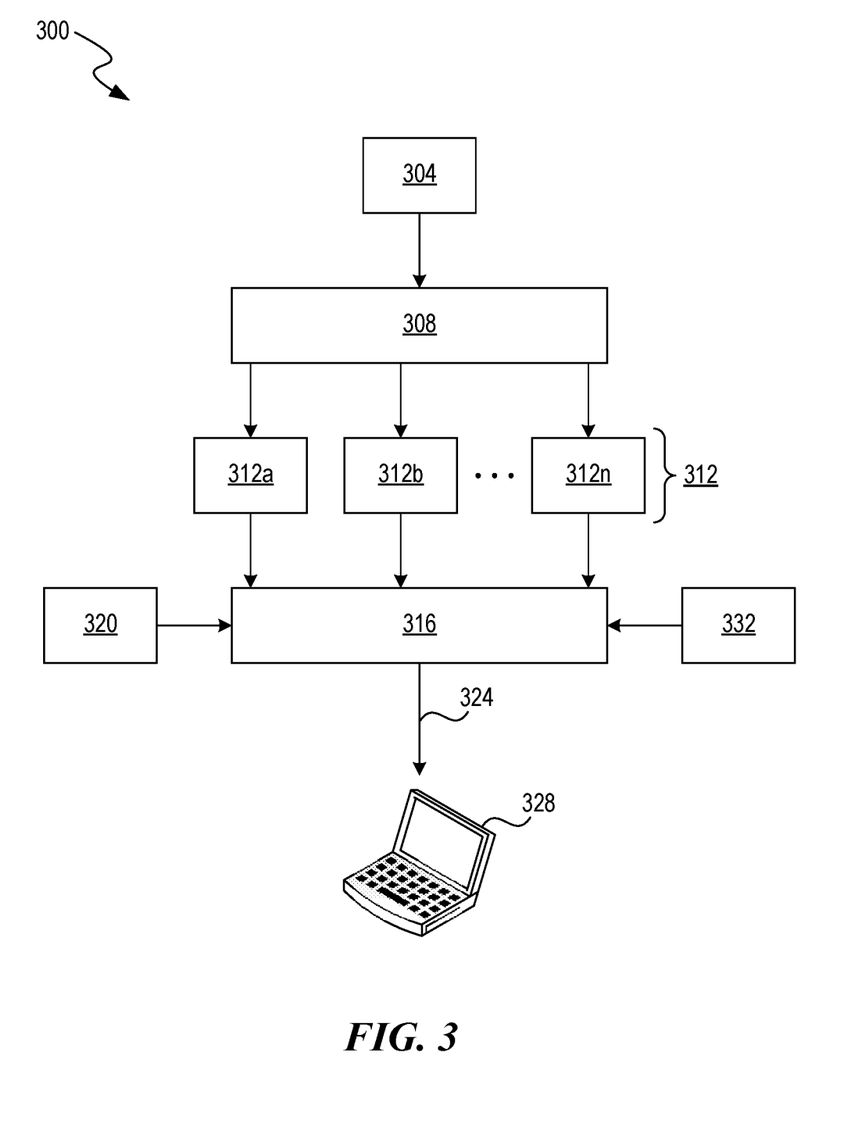
FIG. 3 is a block diagram illustrating an example machine learning system for prevention of electronic content capture using an embedded key server module, in accordance with one or more embodiments.

In some embodiments, the device 116 determines that the one or more user interface elements 112 are present in the first media content frame 108 by executing a machine learning model 316 on the first media content frame 108. The machine learning model 316 is illustrated and described in more detail with reference to FIG. 3. The machine learning model 316 uses the first media content frame 108 as the input data 304 illustrated and described in more detail with reference to FIG. 3. The machine learning model 316 is trained based on the training data 320 to detect the one or more user interface elements 112. For example, the training data 320 includes a labeled version of historical or stored media content frames or videos. In some embodiments, the device 116 extracts a feature vector 312 from the first media content frame 108. The feature vector 312 is illustrated and described in more detail with reference to FIG. 3. For example, a feature 312a can describe a chat bubble. A feature 312b can describe a soft button, such as a reset button. A feature 312n can describe an on-screen menu. In some embodiments, the device 116 sends the feature vector 312 as input to the machine learning model 316 for determining that the one or more user interface elements 112 are present in the first media content frame 108. The output 324 of the machine learning model 316 indicates presence or absence of the one or more user interface elements 112 in the first media content frame 108. The device 328 illustrated and described in more detail with reference to FIG. 3 is the same as or similar to the device 116.

In some embodiments, determining that the one or more user interface elements 112 are present in the first media content frame 108 is performed by optical character recognition (OCR) or natural language processing. OCR refers to the electronic conversion of images of typed, handwritten, or printed text into machine-encoded text. The device 116 can perform OCR on the first media content frame 108 to determine if the first media content frame 108 includes a chat bubble, menu, or comment bubble with text. Natural language processing refers to methods to program computers to process and analyze natural language data, such as the contents of documents. The device 116 can perform natural language processing on the first media content frame 108 to determine if the first media content frame 108 includes a chat bubble, menu, or comment bubble with text.

In some embodiments, the one or more user interface elements 112 are converted to DRM'ed streams. For example, the device 116 extracts the one or more user interface elements 112 from the first media content frame 108. In some embodiments, the device 116 uses OCR or natural language processing to extract the one or more user interface elements 112. In other embodiments, the device 116 uses image processing techniques such as edge detection, cropping, etc., to extract the one or more user interface elements 112. For example, the device 116 can identify points in the first media content frame 108 at which the image brightness changes sharply or has discontinuities. The device 116 can organize the points into a set of curved line segments to extract the user interface elements 112. In some embodiments, the device 116 can remove some of the peripheral areas of the first media content frame 108 to extract the user interface elements 112, change the aspect ratio, or to accentuate or isolate the user interface elements 112 from the first media content frame 108.

The device 116 converts the one or more user interface elements 112 to a video 136. In one embodiment, the device 116 repeats the user interface element 112 over a necessary number of frames, such as 24, 30, or 60 frames to generate one or more seconds of video. In some embodiments, the device 116 changes the storage format of the user interface elements 112 or recompresses the user interface elements 112 to a video format. In other embodiments, the device 116 performs transcoding on the user interface elements 112 to convert the user interface elements 112 to the video 136. Transcoding refers to direct digital-to-digital conversion of one encoding to another, such as for movie data files, audio files (e.g., MP3, WAV), or character encoding.

In some embodiments, prior to encrypting the video 136, the device 116 packages the video 136 using the HTTP Live Streaming (HLS) protocol. HLS refers to a streaming protocol that supports file storage in both MPEG-TS and fragmented mp4 (fmp4) container formats. The device 116 encrypts the video 136 to prevent screenshot capture of the one or more user interface elements 112 present in the first media content frame 108 by the second computer device 132 if the second computer device 132 does not have access to a decryption key 124 needed to decrypt the video 136. The decryption key 124 can be a digital number, such as a 32-bit, 64-bit, or 124-bit number that is generated by the device 116 during encryption of the video 136. The decryption key 124 is used for digital rights management (DRM) by the device 116 or a content service provider to prevent unauthorized copying and sharing of the one or more user interface elements 112 when the video 136 is played on the digital screen 140 of the second computer device 132.

In some embodiments, the device 116 encrypts the video 136 by converting it into MPEG-2 format. In other embodiments, the device 116 encrypts the video 136 by converting it into an MP4 container file having an encrypted advanced audio coding (AAC) layer. The AAC layer includes the video 136. In some embodiments, encrypting the video 136 is performed using an advanced encryption standard (AES) algorithm. AES refers to a subset of the Rijndael block cipher. Rijndael is a family of ciphers having different key and block sizes. In some instances, AES has a block size of 128 bits. AES can have different key lengths: 128, 192, and 256 bits.

To encrypt the video, the AAC layer can be encrypted using the AES algorithm. In some embodiments, SAMPLE-AES is used. SAMPLE-AES is used to encrypt each individual media sample (e.g., video, audio, etc.) on its own using AES encryption. The specific encryption and packaging can be varied depending on the media format, e.g., H. 264, AAC, etc. SAMPLE-AES allows fine-grained encryption modes, e.g., encrypting only I frames, encrypting 1 out of 10 samples, etc.

A decryption key 124 on the second computer device 132 is required to decrypt the video 136. For example, after packaging the video 136, the device 116 encrypts the contents using AES-128 Cipher Block Chaining (CBC) encryption. In CBC mode, an output of the last block of encryption is used to affect a current block. In some embodiments, an initialization vector (IV) is used to generate different ciphertexts (output of the encryption process) even when the same plaintext (input) is encrypted multiple times independently with the same key. The IV behaves like a randomizer and prevents malicious entities or unauthorized users from recreating the decryption key 124 by observing the ciphertext patterns to identify repetitions. In some embodiments, only a portion (e.g., the video 136) of a video segment (e.g., the first media content frame 108) is encrypted using AES-128. The entire video segment (e.g., the first media content frame 108) is not encrypted; this results in power-savings both for the encryption and decryption process (especially as the video resolution of the second media content frame 128 increases).

In some embodiments, the second computer device 132 sends a request to the device 116 for the decryption key 124 when the second computer device 132 encounters the video 136 during playback of the second media content frame 128. For example, a client application (the application or player on the second computer device 132) being used to playback the second media content frame 128 sends a request message to the device 116 or to a license server to obtain the decryption key 124. The device 116 receives the request for the decryption key 124 from the second computer device 132. The device 116 transmits the decryption key 124 to the second computer device 132 for decrypting the video 136. For example, the device 116 manages the keys used for encrypting and decrypting protected content. The device 114 or a license server receives a license request from the second computer device 132. The device 114 wraps the decryption key 124 into a context message and sends it back to the player on the second computer device 132.

In other embodiments, when a user of the second computer device 132 obtains authorization for viewing, recording, or sharing premium content, the user can register the second computer device 132 with the content service. The second computer device 132 gains authorization from the first computer device 104 or the content creator's server, thereby gaining the decryption key 124. Upon attempting to play the second media content frame 128, the second computer device 132 attempts to decrypt the video 136 using the decryption key 124, and if successful, allows screenshot capture or recording of the user interface elements 112 present in the second media content frame 128. Because only a portion (e.g., the video 136) of the entire video frame (e.g., the second media content frame 128) is encrypted, the remainder of the second media content frame 128 can be played and captured without the decryption key 124.

The device 116 generates the second media content frame 128 that includes the first media content frame 108 overlaid by the video 136. The video 136 overlays the portion of the first media content frame 108 corresponding to the user interface elements 112. The device 116 transmits the second media content frame 128 to the second computer device 132 for the second media content frame 128 to be played on the digital screen 140 of the second computer device 132. If the second computer device 132 has the correct decryption key 124 (i.e., the user of the second computer device 132 is authorized to record the user interface elements 112), the second computer device 132 will be able to record or screenshot capture the user interface elements 112 overlaid by the video 136. If the second computer device 132 lacks the decryption key 124, the second computer device 132 will be unable to decrypt the video 136 and record or screenshot capture the user interface elements 112. Because only a portion (e.g., the video 136) of the entire video frame (e.g., the second media content frame 128) is encrypted, the remainder of the second media content frame 128 can be played and captured without the decryption key 124. In some embodiments, software to prevent screenshot capture, such as Apple Fairplay or other DRM software is used.

Figure 2:
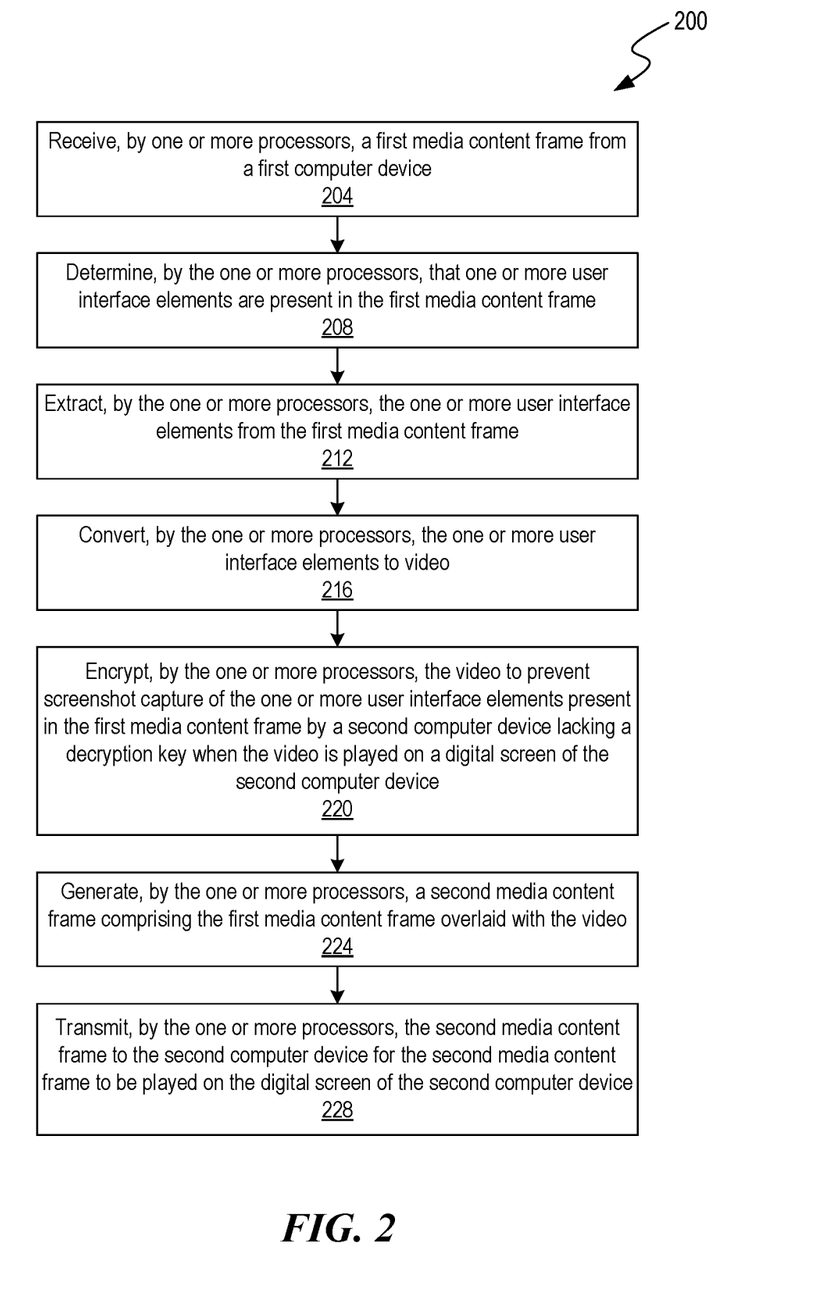
FIG. 2 is a flow diagram illustrating an example process for prevention of electronic content capture using an embedded key server module, in accordance with one or more embodiments.

FIG. 2 is a flow diagram illustrating an example process 200 for prevention of electronic content capture using an embedded key server module, in accordance with one or more embodiments. In some embodiments, the process 200 is performed by the device 116 illustrated and described in more detail with reference to FIG. 1. In other embodiments, the process 200 of FIG. 2 is performed by a computer system, e.g., the example computer system 400 illustrated and described in more detail with reference to FIG. 4. Particular entities, for example a machine learning system 300, perform some or all of the steps of the process in other embodiments. The machine learning system 300 is illustrated and described in more detail with reference to FIG. 3. Likewise, embodiments can include different and/or additional steps, or perform the steps in different orders.

In step 204, the device 116 receives a first media content frame 108 from a first computer device 104. The first media content frame 108 and the first computer device 104 are illustrated and described in more detail with reference to FIG. 1. In some embodiments, the first media content frame 108 is a portion of a video displayed on a screen for, e.g., 1/24, 1/25, or 1/30 of a second. In other embodiments, the first media content frame 108 is a frame of high-definition video. In other embodiments, the first media content frame 108 is represented as a digital waveform in which pixels represent an intensity and color of light across a screen.

In step 208, the device 116 determines that one or more user interface elements 112 are present in the first media content frame 108. The user interface elements 112 are illustrated and described in more detail with reference to FIG. 1. In some embodiments, the one or more user interface elements 112 include at least one of a chat bubble, a soft button, a menu, an icon, or a comment bubble. In some embodiments, determining that the one or more user interface elements 112 are present in the first media content frame 108 is performed by executing a machine learning model 316 on the first media content frame 108. The machine learning model 316 is illustrated and described in more detail with reference to FIG. 3. The machine learning model 316 is trained based on training data 320 to detect the one or more user interface elements 112. The training data 320 is illustrated and described in more detail with reference to FIG. 3. In some embodiments, the device 116 extracts a feature vector 312 from the first media content frame 108. The feature vector 312 is illustrated and described in more detail with reference to FIG. 3. In some embodiments, the device 116 sends the feature vector 312 as input to the machine learning model 316 for determining that the one or more user interface elements 112 are present in the first media content frame 108. In other embodiments, determining that the one or more user interface elements 112 are present in the first media content frame 108 is performed by OCR or natural language processing.

In step 212, the device 116 extracts the one or more user interface elements 112 from the first media content frame 108. In some embodiments, the device 116 uses OCR or natural language processing to extract the one or more user interface elements 112. In other embodiments, the device 116 uses image processing techniques such as edge detection, cropping, etc., to extract the one or more user interface elements 112. For example, the device 116 can identify points in the first media content frame 108 at which the image brightness changes sharply or has discontinuities. The device 116 can organize the points into a set of curved line segments to extract the user interface elements 112.

In step 216, the device 116 converts the one or more user interface elements 112 to video. In some embodiments, the device 116 changes the storage format of the user interface elements 112 or recompresses the user interface elements 112 to a video format. In other embodiments, the device 116 performs transcoding on the user interface elements 112 to convert the user interface elements 112 to the video 136. The device 116 is illustrated and described in more detail with reference to FIG. 1. Transcoding refers to direct digital-to-digital conversion of one encoding to another, such as for movie data files, audio files (e.g., MP3, WAV), or character encoding.

In step 220, the device 116 encrypts the video 136 to prevent screenshot capture. Screenshot capture of the one or more user interface elements 112 present in the first media content frame 108 is prevented by the second computer device 132 if the second computer device 132 lacks access to the decryption key 124 when the video 136 is played on the digital screen 140 of the second computer device 132. The decryption key 124, the second computer device 132, and the digital screen 140 are illustrated and described in more detail with reference to FIG. 1. In some embodiments, encrypting the video 136 is performed using an AES algorithm.

In step 224, the device 116 generates a second media content frame 128 including the first media content frame 108 overlaid by the video 136. The video 136 overlays the portion of the first media content frame 108 corresponding to the user interface elements 112.

In step 228, the device 116 transmits the second media content frame 128 to the second computer device 132 for the second media content frame 128 to be played on the digital screen 140 of the second computer device 132. If the second computer device 132 has the correct decryption key 124 (i.e., the user of the second computer device 132 is authorized to record the user interface elements 112), the second computer device 132 will be able to record or screenshot capture the user interface elements 112 overlaid by the video 136. If the second computer device 132 lacks the decryption key 124, the second computer device 132 will be unable to decrypt the video 136 and record or screenshot capture the user interface elements 112. Because only a portion (e.g., the video 136) of the entire video frame (e.g., the second media content frame 128) is encrypted, the remainder of the second media content frame 128 can be played and captured without the decryption key 124.

FIG. 3 is a block diagram illustrating an example machine learning system 300 for prevention of electronic content capture using an embedded key server module, in accordance with one or more embodiments. The machine learning system 300 is implemented using components of the example computer system 400 illustrated and described in more detail with reference to FIG. 4. For example, the machine learning system 300 can be implemented on the processor 402 using instructions 408 programmed in the memory 406 illustrated and described in more detail with reference to FIG. 4. Likewise, embodiments of the machine learning system 300 can include different and/or additional components, or be connected in different ways. The machine learning system 300 is sometimes referred to as a machine learning module.

The machine learning system 300 includes a feature extraction module 308 implemented using components of the example computer system 400 illustrated and described in more detail with reference to FIG. 4. In some embodiments, the feature extraction module 308 extracts a feature vector 312 from input data 304. For example, the input data 304 can include the first media content frame 108 illustrated and described in more detail with reference to FIG. 1. The feature vector 312 includes features 312a, 312b, . . . , 312n. The feature extraction module 308 reduces the redundancy in the input data 304, e.g., repetitive data values, to transform the input data 304 into the reduced set of features 312, e.g., features 312a, 312b, and 312n. The feature vector 312 contains the relevant information from the input data 304, such that events or data value thresholds of interest can be identified by the machine learning model 316 by using this reduced representation. In some example embodiments, the following dimensionality reduction techniques are used by the feature extraction module 308: independent component analysis, Isomap, Kernel PCA, latent semantic analysis, partial least squares, principal component analysis, multifactor dimensionality reduction, nonlinear dimensionality reduction, Multilinear Principal Component Analysis, multilinear subspace learning, semidefinite embedding, Autoencoder, and deep feature synthesis.

In alternate embodiments, the machine learning model 316 performs deep learning (also known as deep structured learning or hierarchical learning) directly on the input data 304 to learn data representations, as opposed to using task-specific algorithms. In deep learning, no explicit feature extraction is performed; the features 312 are implicitly extracted by the machine learning system 300. For example, the machine learning model 316 can use a cascade of multiple layers of nonlinear processing units for implicit feature extraction and transformation. Each successive layer uses the output from the previous layer as input. The machine learning model 316 can thus learn in supervised (e.g., classification) and/or unsupervised (e.g., pattern analysis) modes. The machine learning model 316 can learn multiple levels of representations that correspond to different levels of abstraction, wherein the different levels form a hierarchy of concepts. In this manner, the machine learning model 316 can be configured to differentiate features of interest from background features.

In alternative example embodiments, the machine learning model 316, e.g., in the form of a convolutional neural network (CNN) generates the output 324, without the need for feature extraction, directly from the input data 304. The output 324 is provided to the computer device 328 or the device 116 illustrated and described in more detail with reference to FIG. 1. The device 116 is a server, computer, tablet, smartphone, smart speaker, etc., implemented using components of the example computer system 400 illustrated and described in more detail with reference to FIG. 4. In some embodiments, the steps performed by the machine learning system 300 are stored in memory on the computer device 116 for execution.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The machine learning model 316 can be a CNN that includes both convolutional layers and max pooling layers. The architecture of the machine learning model 316 can be "fully convolutional," which means that variable sized sensor data vectors can be fed into it. For all convolutional layers, the machine learning model 316 can specify a kernel size, a stride of the convolution, and an amount of zero padding applied to the input of that layer. For the pooling layers the model 316 can specify the kernel size and stride of the pooling.

In some embodiments, the machine learning system 300 trains the machine learning model 316, based on the training data 230, to correlate the feature vector 312 to expected outputs in the training data 330. As part of the training of the machine learning model 316, the machine learning system 300 forms a training set of features and training labels by identifying a positive training set of features that have been determined to have a desired property in question, and, in some embodiments, forms a negative training set of features that lack the property in question.

The machine learning system 300 applies machine learning techniques to train the machine learning model 316, that when applied to the feature vector 312, outputs indications of whether the feature vector 312 has an associated desired property or properties, such as a probability that the feature vector 312 has a particular Boolean property, or an estimated value of a scalar property. The machine learning system 300 can further apply dimensionality reduction (e.g., via linear discriminant analysis (LDA), principle component analysis (PCA), or the like) to reduce the amount of data in the feature vector 312 to a smaller, more representative set of data.

The machine learning system 300 can use supervised machine learning to train the machine learning model 316, with feature vectors of the positive training set and the negative training set serving as the inputs. In some embodiments, different machine learning techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 332 is formed of additional features, other than those in the training data 330, which have already been determined to have or to lack the property in question. The machine learning system 300 applies the trained machine learning model 316 to the features of the validation set 332 to quantify the accuracy of the machine learning model 316. Common metrics applied in accuracy measurement include: Precision and Recall, where Precision refers to a number of results the machine learning model 316 correctly predicted out of the total it predicted, and Recall is a number of results the machine learning model 316 correctly predicted out of the total number of features that did have the desired property in question. In some embodiments, the machine learning system 300 iteratively re-trains the machine learning model 316 until the occurrence of a stopping condition, such as the accuracy measurement indication that the machine learning model 316 is sufficiently accurate, or a number of training rounds having taken place.

In some embodiments, ML system 300 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised machine learning to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Figure 4:
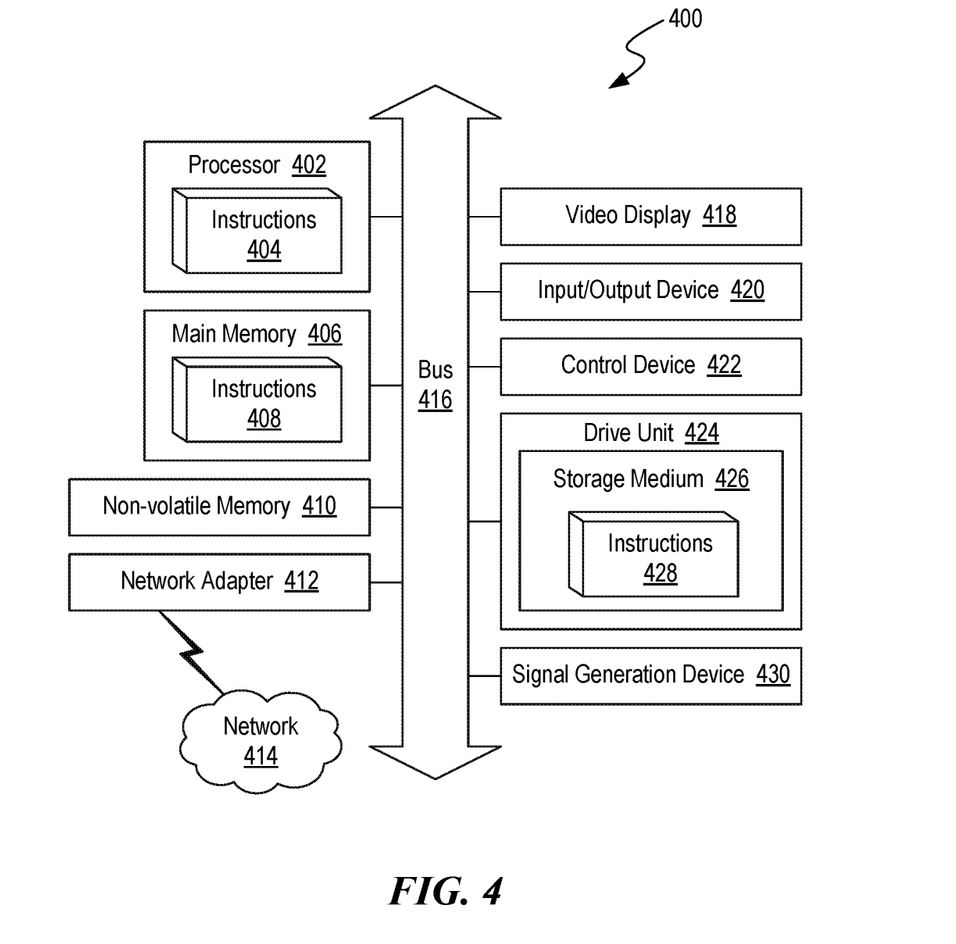
FIG. 4 is a block diagram illustrating an example computer system for prevention of electronic content capture using an embedded key server module, in accordance with one or more embodiments.

FIG. 4 is a block diagram illustrating an example computer system 400 for prevention of electronic content capture using an embedded key server module, in accordance with one or more embodiments. Components of the example computer system 400 can be used to implement the first computer device 104, the device 116, and the second computer device 132 illustrated and described in more detail with reference to FIG. 1. In some embodiments, components of the example computer system 400 are used to implement the machine learning system 300 illustrated and described in more detail with reference to FIG. 2. At least some operations described herein can be implemented on the computer system 400.

The computer system 400 can include one or more central processing units ("processors") 402, main memory 406, non-volatile memory 410, network adapter 412 (e.g., network interface), video display 418, input/output devices 420, control device 422 (e.g., keyboard and pointing devices), drive unit 424 including a storage medium 426, and a signal generation device 430 that are communicatively connected to a bus 416. The bus 416 is illustrated as an abstraction that represents one or more physical buses and/or point-to-point connections that are connected by appropriate bridges, adapters, or controllers. The bus 416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 400 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 400.

While the main memory 406, non-volatile memory 410, and storage medium 426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 428. The term "machine-readable medium" and "storage medium" shall also be taken to include any medium that is capable of storing, encoding, or carrying a set of instructions for execution by the computer system 400.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 404, 408, 428) set at various times in various memory and storage devices in a computing device. When read and executed by the one or more processors 402, the instruction(s) cause the computer system 400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 410, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 412 enables the computer system 400 to mediate data in a network 414 with an entity that is external to the computer system 400 through any communication protocol supported by the computer system 400 and the external entity. The network adapter 412 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 412 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

Figure 5:
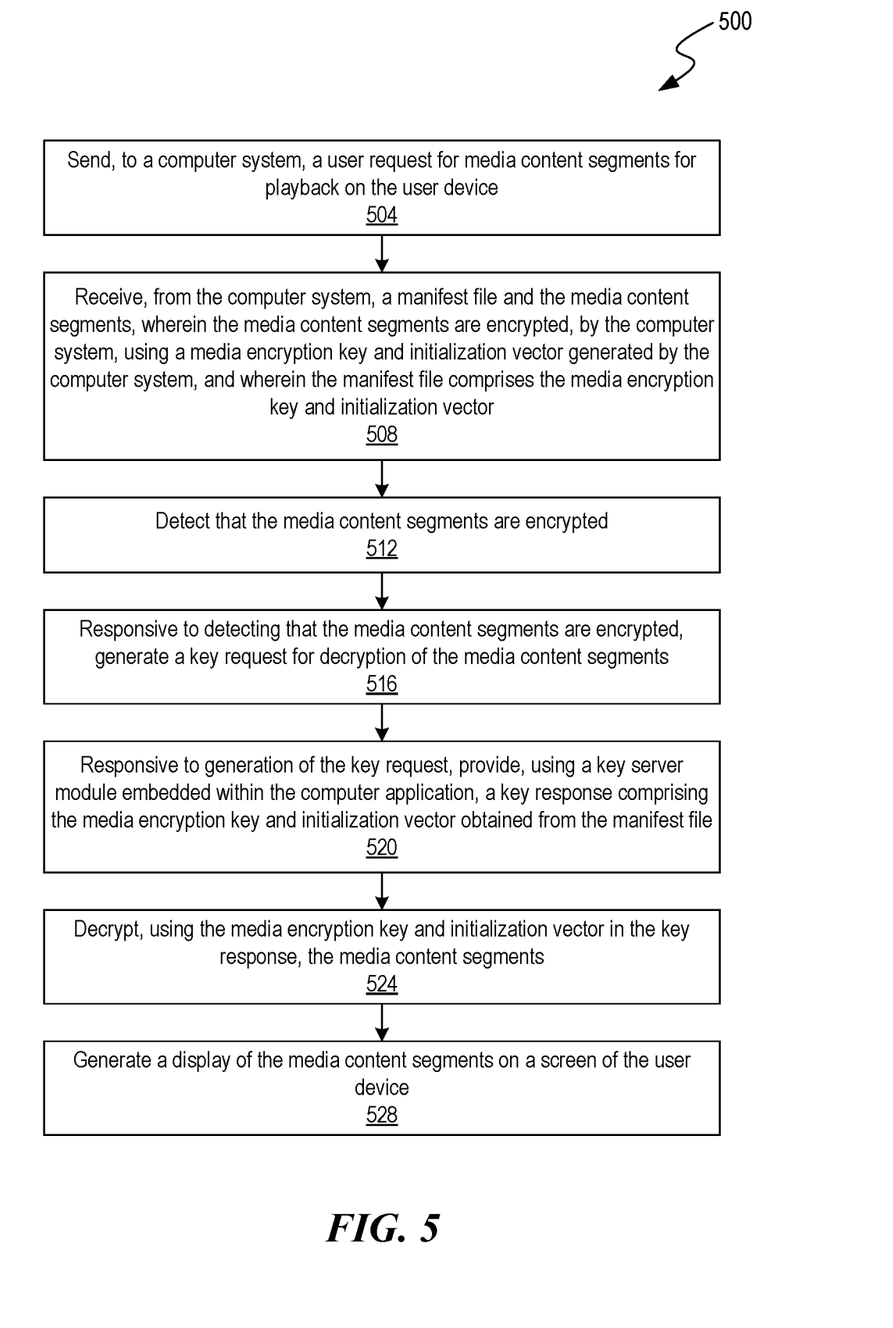
FIG. 5 is a flow diagram illustrating an example process for prevention of electronic content capture using an embedded key server module, in accordance with one or more embodiments.

FIG. 5 is a flow diagram illustrating an example process 500 for prevention of electronic content capture using an embedded key server module, in accordance with one or more embodiments. In some embodiments, the process 500 is performed by the user device 132 illustrated and described in more detail with reference to FIG. 1. In other embodiments, the process 500 of FIG. 5 is performed by a computer system, e.g., the example computer system 400 illustrated and described in more detail with reference to FIG. 4. Particular entities, for example a machine learning system 300, perform some or all of the steps of the process in other embodiments. The machine learning system 300 is illustrated and described in more detail with reference to FIG. 3. Likewise, embodiments can include different and/or additional steps, or perform the steps in different orders.

In act 504, a user device sends a user request or message to a computer server for media content for playback on the user device. The computer server can be device 116 illustrated and described in more detail with reference to FIG. 1. The user device includes a non-transitory computer readable storage medium storing a computer application comprising computer instructions for prevention of electronic content capture. In some embodiments, the computer application is a mobile application or app downloaded from an app store and designed to run on a mobile device such as a phone, tablet, or watch. In some implementations, the computer instructions are executed by one or more computer processors of the user device to cause the user device to perform the process 500 of FIG. 5.

The media content segments are previously uploaded to the computer server by a computer device (e.g., first computer device 104 illustrated and described in more detail with reference to FIG. 1) of a content creator or distributor. In act 508, the user device receives a manifest file and the media content segments from the computer server. The manifest file is a file containing metadata for a group of accompanying files (e.g., the media content segments) that are part of a set or coherent unit. For example, the manifest describes the name, version number, license and the constituent files of the media content segments. The media content segments can be streaming multimedia for playback using an offline or online media player. Technically, a stream is delivered and consumed in a continuous manner from a client, with little or no intermediate storage in network elements.

In some implementations, the media content segments are encrypted by the computer server using a media encryption key (sometimes referred to as a "content key") and initialization vector generated by the computer server. The media content segments can be encrypted using an advanced encryption standard (AES) algorithm. The media encryption key enables content protection using media encryption and DRM. For example, the media content is encrypted, stored on an origin server (e.g., device 116), and streamed or downloaded to client devices and applications over an open network. The computer server can be a DRM (Digital Rights Management) license server used to deliver, ahead of time or on demand, the key or keys needed to decrypt and play the media. In some embodiments, the encryption standard used is AES-128) and the media format is MPEG DASH with MP4 fragments or HLS. The element that ties the content encryption and the content management together is the media encryption key used to encrypt the content. In some examples, the media encryption key used with the AES encryption algorithm is 128 pseudorandom bits (16 bytes/octets).

The manifest file comprises the media encryption key and initialization vector. The initialization vector is an arbitrary number that can be used with the media encryption key for data encryption and decryption. For example, the initialization vector or starting variable is an input to a cryptographic primitive being used to provide the initial state. The initialization vector is typically required to be random or pseudo-random, but sometimes the initialization vector is only unpredictable or unique. In some embodiments, the media content segments comprise an MPEG2 transport stream. The MPEG2 transport stream is a digital container format for transmission and storage of audio, video, and Program and System Information Protocol (PSIP) data. The manifest file can comprise an M3U8 file. An M3U8 file is a UTF-8 encoded playlist file. An M3U8 file can include references to online files or a playlist. The manifest file containing the media encryption key and initialization vector is sent from the computer server to the user device only when the receiving user device and user or entity is authorized to display and view electronic content present within the media content segments.

In some embodiments, the user device generates a key pair comprising the media encryption key and a private key corresponding to the media encryption key. For example, the media encryption key is encrypted using a public key. The user device stores the private key within a secure enclave of the user device. The user device sends the media encryption key, to the computer server, for encrypting the media content segments. Several beneficial methods can be used for sending a media encryption key and an initialization vector to the user device. In some examples, the media encryption key and the initialization vector are sent unencrypted as plaintext within an m3u8 manifest file. In some examples, the media encryption key and the initialization vector are encrypted within the m3u8 manifest file or sent an alternative method (e.g., via a separate network request).

While most users will typically receive the same media encryption key and initialization vector for each piece of media content (media content segment), in some implementations, the media encryption key and initialization vector are encrypted before or during delivery from the computer server to the user device. For example, once a user signs up for service, the computer server instructs the user device to generate a public/private key pair. Generation of the public/private key pair is performed within a trusted execution environment on the user device, sometimes referred to as a secure compartment, a secure enclave, or a hardware-backed keystore. The user device sends the public key to the computer server for storage and use. When a user requests media content from the computer server, the computer server fetches the stored copy of the public key. The computer server encrypts the media encryption key and initialization vector using the public key. The computer server embeds the encrypted media encryption key and initialization vector within a manifest file, or sends the encrypted media encryption key and initialization vector via a separate network request to the user device.

When the computer application executing on the user device receives the encrypted media encryption key and initialization vector, the computer application sends a request to the user device's trusted execution environment (secure compartment) to decrypt the encrypted media encryption key and initialization vector. The trusted execution environment decrypts the encrypted media encryption key and initialization vector. The computer application passes the media encryption key and initialization vector to the embedded key server module. The public key can therefore be used to obfuscate, via encryption, the media encryption key and initialization vector during transit from the computer server to the user device. The computer server generates the media encryption key and initialization vector, which uniquely correspond to the media content regardless of whether the transmission of the media encryption key and initialization vector to the user device is encrypted or plaintext.

In act 512, the user device detects that the media content segments are encrypted. For example, the computer application or a Web application attempts to play the audio or video (media content segments) that has one or more encrypted streams. The computer app or browser recognizes that the media is encrypted and fires an encrypted event with metadata (initData) obtained from the media about the encryption.

In act 516, responsive to detecting that the media content segments are encrypted, the user device generates a key request for decryption of the media content segments. The key request can be or include a server playback context (SPC). For example, at the time of playback, the computer application initiates a content key request and generates an SPC. A graphic crypto-context can be created, and a session key, an antireplay seed, integrity verification, or server authentication elements can be generated.

In act 520, responsive to generation of the key request, a key server module embedded within the computer application (and downloaded from an app store with the computer application) can be used to provide a key response comprising the media encryption key (sometimes referred to simply as a "key") and initialization vector, e.g., obtained from the manifest file. The key response can be or include a content key context (CKC). In some implementations, the key server module is an executable computer program. For example, the key server module is software (e.g., executable code) that receives and then serves existing cryptographic keys to the computer application or user device. The media encryption keys distributed by the key server module can be provided as part of a cryptographically protected public key certificate containing the key and also "entity" information about the owner of the key.

In some embodiments, the user device provides, using the key server module, a content key context based on the media encryption key. Providing the content key context obviates a need for the user to communicate with a remote key server to obtain the content key context. Because the key server module is embedded within the computer application and used to provide the media encryption key and initialization vector, a need for the user device to communicate with a remote key server to obtain the media encryption key is obviated. Therefore, the processing time needed to fetch the appropriate content key and initialization vector is significantly reduced. Moreover, the amount of Internet traffic is reduced, leading to network resource conservation.

The certificate can be in a standard format, such as the OpenPGP public key format, the X.509 certificate format, or the PKCS format. Pretty Good Privacy (PGP) is an encryption program that provides cryptographic privacy and authentication for data communication. PGP is used for signing, encrypting, and decrypting texts, e-mails, files, directories, and whole disk partitions and to increase the security of e-mail communications. PGP and similar software follow the OpenPGP, an open standard of PGP encryption software, standard (RFC 4880) for encrypting and decrypting data. Modern versions of PGP are interoperable with GnuPG and other OpenPGP-compliant systems. X.509 is an International Telecommunication Union (ITU) standard defining the format of public key certificates. X.509 certificates are used in Internet protocols, including TLS/SSL, which is the basis for HTTPS. PKCS #12 (also known as PKCS12 or PFX) is a binary format for storing a certificate chain and private key in a single, encryptable file. PKCS #12 files are used to import and export certificates and private keys on Windows and macOS computers, and usually have the filename extensions .p12 or .pfx. The key is typically a public key for use with an asymmetric key encryption algorithm. The key response can be a CKC generated in response to the SPC. For example, the CKC response contains the expiration time along with the content key.

In act 524, the user device can decrypt the media content segments using the media encryption key and initialization vector in the key response. For example, the computer application or a media player determines if the user is authorized to receive the content key and evaluates a content key policy specified. In some embodiments, the user device decrypts, using a content key context, the media content segments. The media encryption key can be encrypted using a public key. Public-key cryptography, or asymmetric cryptography, is the field of cryptographic systems that use pairs of related keys. Each key pair consists of a public key and a corresponding private key. Key pairs are generated with cryptographic algorithms based on mathematical problems termed one-way functions. For example, the user device retrieves a private key corresponding to the public key from a secure compartment of the user device.

The private key (sometimes known as a secret key) can be used with an algorithm to encrypt and decrypt the media content segments. The private key is typically a long, randomly or pseudo-randomly generated sequence of bits that cannot be easily guessed. The complexity and length of the private key determine how easily an attacker can execute a brute-force attack. The secure enclave can be a dedicated secure subsystem integrated into a system-on-chip (SoC) on the user device. The secure enclave is isolated from the main processor to provide an extra layer of security and is designed to keep sensitive user data secure even when the application processor kernel becomes compromised. In some examples using a public-private key pair, the user device performs decryption of the media content segments using the private key.

In some implementations, the media encryption key is encrypted using a public key when it is transmitted by the computer server. The user device retrieves a private key corresponding to the public key from a secure compartment of the user device. The user device decrypts the media encryption key using the private key. The user device can generate a key pair comprising a public and a private key. The user device stores the private key within a secure compartment of the computer system, and sends the public key, to the computer server, for encrypting the media encryption key.

In act 528, the user device generates a display of the media content segments on a screen of the user device. The screen can be video display 418 illustrated and described in more detail with reference to FIG. 4. Thus, unauthorized users and entities are prevented from capturing electronic content (e.g., by screenshots) present within the media content segments without possessing an authorized media encryption key.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory computer readable storage medium storing a computer application comprising computer instructions for prevention of electronic content capture, wherein the computer instructions, when executed by one or more computer processors of a user device, cause the user device to:
   generate a key pair comprising a media encryption key and a private key corresponding to the media encryption key and to a public key;
   store the private key within a secure compartment of the user device;
   send the media encryption key, to a computer server, for encrypting media content segments corresponding to a media content;
   send, to the computer server, a user request for the media content for playback on the user device;
   receive, from the computer server, an encrypted media encryption key, an initialization vector, and the media content segments corresponding to the media content, wherein the media content segments are encrypted, by the computer server, using the media encryption key, and wherein the media encryption key is encrypted using the public key;
   retrieve the private key from the secure compartment of the user device;
   decrypt the encrypted media encryption key using the private key;
   detect that the media content segments are encrypted;
   responsive to detecting that the media content segments are encrypted,
   generate a key request for decryption of the media content segments;
   responsive to generation of the key request,
   provide, using a key server module embedded within the computer application, a content key context based on the media encryption key and the initialization vector;
   decrypt, using the content key context, the media content segments; and
   generate a display of the media content segments on a screen of the user device.

2. The non-transitory computer readable storage medium of claim 1, wherein the computer instructions obviate a need for the user device to communicate with a remote key server to obtain the content key context.

3. The non-transitory computer readable storage medium of claim 1, wherein the key server module is an executable computer program.

4. The non-transitory computer readable storage medium of claim 1, wherein the media content segments comprise an MPEG2 transport stream.

5. The non-transitory computer readable storage medium of claim 1, wherein the key request comprises a server playback context.

6. A computer system comprising:
   a user device comprising one or more computer processors; and
   a non-transitory computer readable storage medium storing computer instructions, which when executed by the one or more computer processors to:
   generate a key pair comprising a media encryption key and a private key corresponding to the media encryption key and to a public key;
   store the private key within a secure compartment of the user device;
   send the media encryption key, to a computer server, for encrypting media content segments corresponding to a media content;
   send, to the computer server, a request for the media content for playback on the computer system;
   receive, from the computer server, an encrypted media encryption key, an initialization vector, and the media content segments corresponding to the media content, wherein the media content segments are encrypted, by the computer server, using the media encryption key, and wherein the media encryption key is encrypted using the public key;
   retrieve the private key from the secure compartment of the user device;
   decrypt the media encryption key using the private key;
   detect that the media content segments are encrypted;
   responsive to detecting that the media content segments are encrypted, generate a key request for decryption of the media content segments;

responsive to generation of the key request, provide, using a key server module embedded within the computer application, a content key context based on the media encryption key and the initialization vector;

decrypt, using the content key context, the media content segments; and generate a display of the media content segments on a screen of the user device.

7. The computer system of claim 6, wherein the computer instructions obviate a need for the user device to communicate with a remote key server to obtain the content key context.

8. The computer system of claim 6, wherein the key server module is an executable computer program.

9. The computer system of claim 6, wherein the media content segments comprise an MPEG2 transport stream.

10. The computer system of claim 6, wherein the media content segments are encrypted using an advanced encryption standard (AES) algorithm.

11. The computer system of claim 6, wherein the request comprises a server playback context.

12. A computer-implemented method comprising:

generating, by a user device, a key pair comprising a media encryption key and a private key corresponding to the media encryption key and to a public key;

storing the private key within a secure compartment of the user device;

sending the media encryption key, to a computer server, for encrypting media content segments corresponding to a media content;

sending, by the user device, a request to the computer server for the media content for playback on the user device;

receiving, from the computer server, an encrypted media encryption key, an initialization vector, and the media content segments corresponding to the media content, wherein the media content segments are encrypted, by the computer server, using the media encryption key, and wherein the media encryption key is encrypted using the public key;

retrieving the private key from the secure compartment of the user device;

decrypting the encrypted media encryption key using the private key;

detecting that the media content segments are encrypted;

responsive to detecting that the media content segments are encrypted, generating a key request for decryption of the media content segments;

responsive to generation of the key request, providing, using a key server module embedded within the computer application, a content key context based on the media encryption key and the initialization vector;

decrypting, using the content key context, the media content segments; and generating a display of the media content segments on a screen of the user device.

13. The method of claim 12, wherein providing the content key context obviates a need for the user device to communicate with a remote key server to obtain the content key context.

14. The method of claim 12, wherein the key server module is an executable computer program.

15. The method of claim 12, wherein the media content segments are encrypted using an advanced encryption standard (AES) algorithm.

* * * * *